United States Patent [19]

Nagata

[11] Patent Number: 5,343,626
[45] Date of Patent: Sep. 6, 1994

[54] METHOD FOR MEASURING GEARS AND SYSTEM FOR MACHINING AND MEASURING GEARS

[75] Inventor: Hiroshi Nagata, Niihama, Japan

[73] Assignee: Sumitomo Heavy Industries, Ltd., Tokyo, Japan

[21] Appl. No.: 9,094

[22] Filed: Jan. 26, 1993

[51] Int. Cl.⁵ .......................... G01B 5/00; B24B 1/00
[52] U.S. Cl. ................... 33/501.14; 33/501.18; 33/501.04; 451/11; 451/47
[58] Field of Search ............ 33/501.7, 501.8, 501.9, 33/501.11, 501.14, 501.15, 501.17, 501.18, 501.04; 73/162; 409/61; 51/165.71, 165.75, 287

[56] References Cited

U.S. PATENT DOCUMENTS

| 3,802,087 | 4/1974 | Raiteri | 33/555.1 |
| 3,897,656 | 8/1975 | Muller et al. | 33/501.14 X |
| 4,602,459 | 1/1986 | Dritz et al. | 51/165.75 X |
| 5,239,782 | 8/1993 | Lorenz et al. | 51/165.71 X |

FOREIGN PATENT DOCUMENTS

| 0044660 | 4/1977 | Japan | 33/501.14 |
| 2107874 | 5/1983 | United Kingdom | 73/162 |

Primary Examiner—William A. Cuchlinski, Jr.
Assistant Examiner—Alvin Wirthlin
Attorney, Agent, or Firm—Oblon, Spivak, McClelland, Maier & Neustadt

[57] ABSTRACT

A gauge head is attached to the grindstone holder of an NC gear grinding machine, and the tooth profile, tooth trace, gear pitch, etc. of a ground gear are measured on the NC gear grinding machine by actuating the control functions of various parts provided on the machine without detaching the gear from the machine. The gauge head attached to the grindstone holder can be retracted from a position where the gauge head contacts with the tooth flank located between the grinder and the gear of the ground gear on the grinding machine to a position where the gauge head does not interfere with the wheel during grinding operation, so that the wheel need not be detached from the machine even during the gear measurement.

7 Claims, 7 Drawing Sheets

METHOD FOR MEASURING GEARS AND SYSTEM FOR MACHINING AND MEASURING GEARS

BACKGROUND OF THE INVENTION

1. Field of the Invention

The present invention relates to a method for measuring gears machined by an NC gear grinding machine and to a system which combines as a machine for grinding and forming gears using a grinding wheel and as a device for measuring the ground gears in-situ without detaching the same from the grinding machine.

2. Discussion of the Background

In the manufacture of high-precision gears that are machined by a gear grinding machine, it is a common practice to sample at least one gear in one production lot and check the tooth profile, trace, etc. to determine whether the machining conditions are appropriate before proceeding with the machining of the remaining gears in the lot.

Conventionally, precision inspection of gears in the gear grinding machine of this type has been conducted using a measurement device dedicated for this particular purpose. Attempts are now being made to develop a gear grinding machine which is capable of measuring the gears in-situ after completion of grinding to improve the efficiency, such as proposed, for example, by Japanese Utility Model Application Laid Open No. 92322/1989. According to this prior art, precision of tooth profile is checked while the ground gear is still attached to the work piece spindle of a gear generating-/machining device. The gauge head of a measurement device which is fixed to the column plate is contacted with the tooth flank of said gear, which is caused to move in its movement of rolling in the basic circle by the rotation of the spindle and by the traverse of the spindle stock. The output signals of said measuring device are transmitted to a separate control device for data processing to check the precision.

The prior art method of inspecting the gear precision with a separate device is defective in that it takes time to transfer the workpiece or set the measurement conditions on the device. On the other hand, the gear grinding machine capable of measuring the gears is defective in that the types of gear that can be measured are limited, and in that it requires extra cost of adding mechanisms and devices such as for causing the ground gear to roll and for processing of the output signal data from the measurement device.

SUMMARY OF THE INVENTION

The present invention attempts to solve the problems encountered in the prior art and aims at providing a method for measuring the precision of ground gears and a gear grinding system which also serves as a device for measuring the precision without the need for additional control functions by utilizing the intrinsic functions of an NC grinding machine.

According to the present invention, there is provided a method for measuring the tooth profile, trace, pitch, etc. on an NC grinding machine by attaching a gauge head to the grindstone holder of said grinding machine and by utilizing the control functions of various component parts of the machine.

The gear grinding system combined with a device for measuring the precision of ground gears according to the present invention is characterized in that a gauge head which is attached to the grindstone holder of an NC gear grinding machine comes in contact with the tooth flank of the ground gear on the work holder during measurement operation and in that the gauge head can be retracted to a position where it does not interfere with the gear and the grinding wheel during grinding operation.

According to the present invention, a ground gear can be directly subjected to in-situ measurement on the grinding machine, i.e. with the wheel and the ground gear being mounted on the machine. Control of the various spindles during measurement can be achieved by utilizing the original control functions of an NC grinding machine. Because there is no need for additional control means or modifications of various parts, the present invention provides a gear grinding system which is combined with a device for measuring the ground gears and which is inexpensive, compact in size and widely applicable.

BRIEF DESCRIPTION OF THE DRAWINGS

The foregoing and other objects, features and advantages of the invention will be apparent from the following more particular description of the preferred embodiments of the invention illustrated in the accompanying drawings, wherein.

DESCRIPTION OF THE PREFERRED EMBODIMENTS

Figure 1:
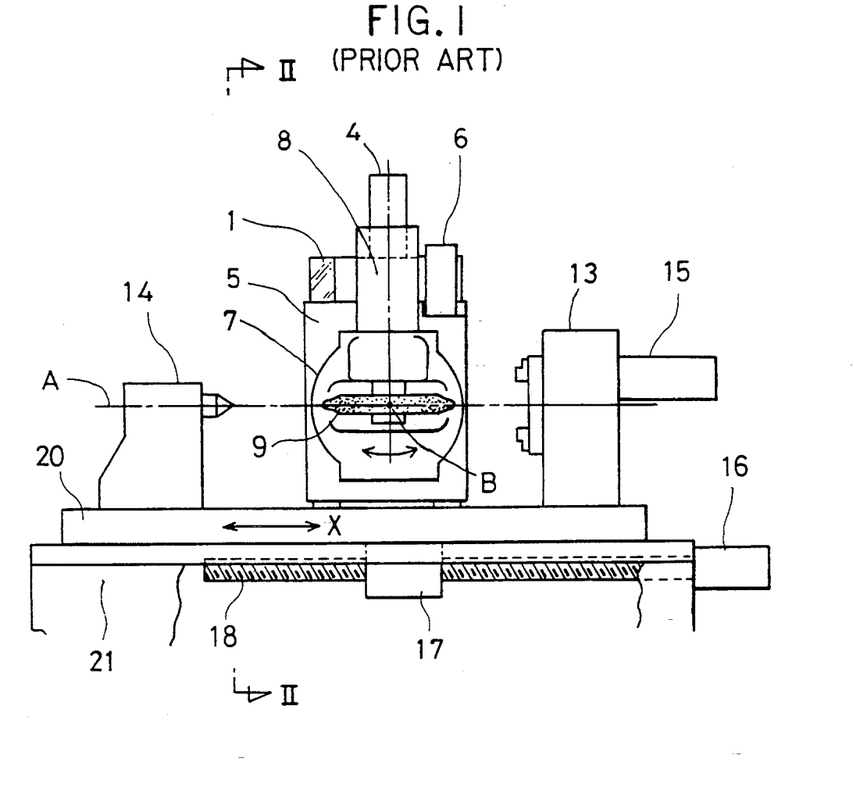
FIG. 1 is a front view of an NC gear grinding machine to which the present invention is applied.
Figure 2:
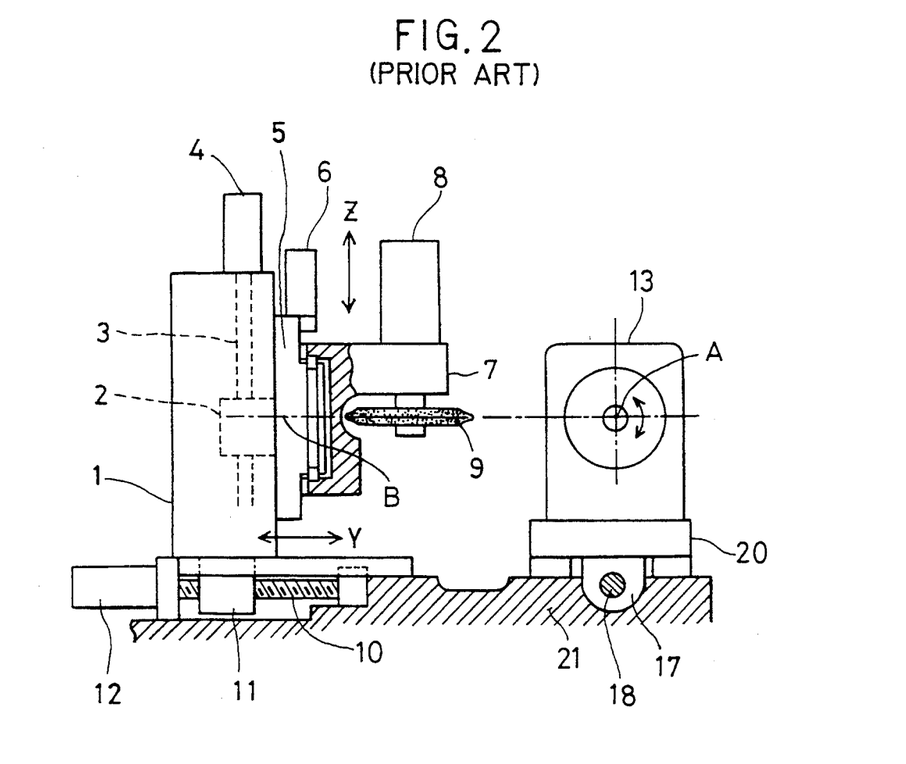
FIG. 2 is a sectional side view taken along the line II—II of FIG. 1.

Referring now to FIGS. 1 and 2, an X-axis table 20 is mounted on a T-shape bed 21. An indexing table 13 and a tailstock 14 are mounted on the X-axis table 20 with their spindle centers aligned (A-axis), and a workpiece to be ground (not shown in FIGS. 1 and 2) is placed therebetween. The X-axis table 20 is capable of lateral reciprocation (in the direction of X-axis) via a ball screw shaft 18 and a ball screw nut 17 driven by an X-axis servomotor 16 on one side of the bed. The gear holder of the indexing table 13 can be rotated about the shaft center for indexing as driven by an A-axis servomotor 15. A column 1 is mounted on the rear of the T-shape bed 21 at the center and is capable of transversal reciprocation in the direction of Y-axis as driven by a Y-axis servomotor 12 via a ball screw shaft 10 and a ball screw nut 11. A Z-axis table 5 is mounted in front of said column 1 and is similarly capable of vertical reciprocation (in the Z-axis direction) as driven by a Z-axis servomotor 4 disposed above the column 1 via a ball screw shaft 3 and a ball screw nut 2. A grindstone holder 7 is mounted in front of the Z-axis table 5 and a grinding wheel 9 with a geometry of the tooth space of the gear to be ground is journalled to the grindstone holder 7. The reference number 8 denotes a grindstone spindle motor that drives and turns the grindstone wheel 9. The grindstone holder 7 is driven by a B-axis servomotor 6 retained on the Z-axis table 5 and is capable of turning about the horizontal axial line (B-axis) which passes the shaft center of the wheel perpendicular to the axial line of said A-axis. Thus, the grindstone holder 7 (the wheel 9) can be inclined for an angle that corresponds to the helix angle if the workpiece to be machined is a helical gear. In case the B-axis servomotor 6 is not used, the grindstone holder 7 can be manually inclined about the B-axis.

For gear grinding operation, a workpiece to be ground is placed between the indexing table 13 and the tailstock 14 and is engaged with the grindstone wheel 9 for grinding operation, in which the workpiece is moved in the facewidth direction by the X-axis servomotor 16. Upon grinding of one tooth space, the workpiece is indexed and turned for one pitch by the servomotor 15 connected to the indexing table 13 and then ground for the next tooth space. In case of cutting and crowning, the wheel 9 is controlled to move in the directions of Y- and Z-axes using the Y- and Z-axis servo motors 12 and 4 respectively. When the wheel is to be dressed or modified, it is possible to mount a dresser, instead of the workpiece, between the indexing table 13 and the tailstock 14 to carry out the dressing operation on the grinding machine by the simultaneous control of respective axes.

Figure 3:
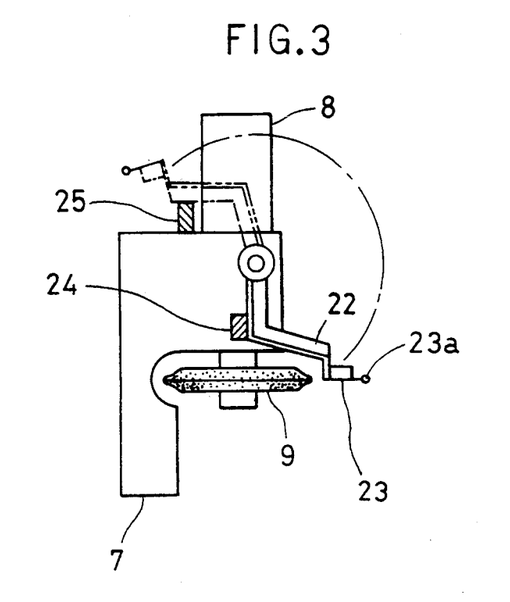
FIG. 3 is a side view of the grindstone holder according to one embodiment of the present invention to which a gauge head is attached.

The grinding system combined with the function of gear measurement according to one embodiment of the present invention is constructed with an NC gear grinding machine capable of at least three-axis simultaneous control, to which a gauge head such as an electric micrometer is attached. Referring now to FIG. 3, the grindstone holder 7 itself is same as that shown in FIGS. 1 and 2. The base of a gauge head arm 22 is substantially L-shape and is journalled to the side of the grindstone holder adjacent to the grindstone wheel 9. The tip end of said arm 22 is attached with a gauge head 23 such as an electric micrometer. The arm 22 of the gauge head is capable of swinging between the position where the gauge head 23 extends toward the gear to be ground for measurement (shown in solid line in FIG. 3) and the upper position where it rests (dotted line). A stopper 24 abutting against the back of the arm 22 is provided on the side of the grindstone holder 7 to securely hold the arm 22 in position for measurement. Similarly, a stopper 25 is provided on the top face of the grindstone holder 7 to hold the arm 22 of the gauge head in the rest position. Because of the stopper 24 for measuring operation, the repeated positioning precision during measurement can be easily maintained at about 0.5 μm when the arm 22 of said gauge head is swung from the backward rest position to the front position.

Figure 4:
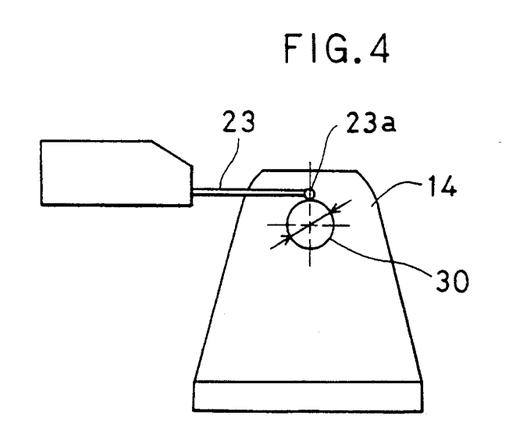
FIG. 4 is a side view showing one example of positioning of the tip of the gauge head according to the present invention.

The gauge head 23 is positioned at its tip end with respect to the shaft center (A-axis) of the gear by mounting a cylindrical member 30 (e.g. work arbor, center spindle) of a known radius between the tailstock 14 and the indexing table 13. It is also possible to cause the gauge head to directly abut against the target portion to be ground on the gear. If the precision in repeated positioning of the arm 22 is inadequate, the gauge head 23 is positioned each time as shown in FIG. 4.

Measurement of tooth profile for involute gears will now be explained referring to FIG. 5. The tip end 23a of the gauge head 23 is caused to move from point A to point B along the tangential line PT of the basic circle C of the gear by simultaneous control of the movements of the Y-axis table and Z-axis table as well as the A-axis rotation of the indexing table. The deflection of the tip end 23a of the gauge head 23 is outputted as data. Some of the control programs used for grinding operation may be utilized as the program for controlling of respective axes. If the movements of various parts are correct and if the gear profile has been ground in accordance with the theory, the deflection of the gauge head 23 becomes zero. Given the coordinate values of point A as (YA, ZA), the coordinates of point B (YB, ZB) are given as below:

$$YB = YA + L\sin\theta_1$$

$$ZB = ZA + L\cos\theta_1$$

$$\theta = \tan\alpha B - \tan\alpha A$$

wherein the symbol L denotes the distance the tip end 23a of the gauge head travels from point A to point B. The symbol αA denotes the pressure angle of point A and αB the pressure angle of point B.

The tip end 23a of the gauge head moves in the Y- and Z-axis directions from point A to point B by rotation of the gear 31 around the A-axis while being in contact with one of the tooth flanks 31a of a tooth, whereby the tooth profile of any arbitrary tooth flank 31a can be measured. Upon completion of profile measurement of a tooth, the gear 31 is indexed and turned for one pitch while the tip end 23a of the gauge head is returned to the original position before proceeding with the next measurement. In FIG. 5, the symbol rg denotes the radius of the basic circle.

Figure 5:
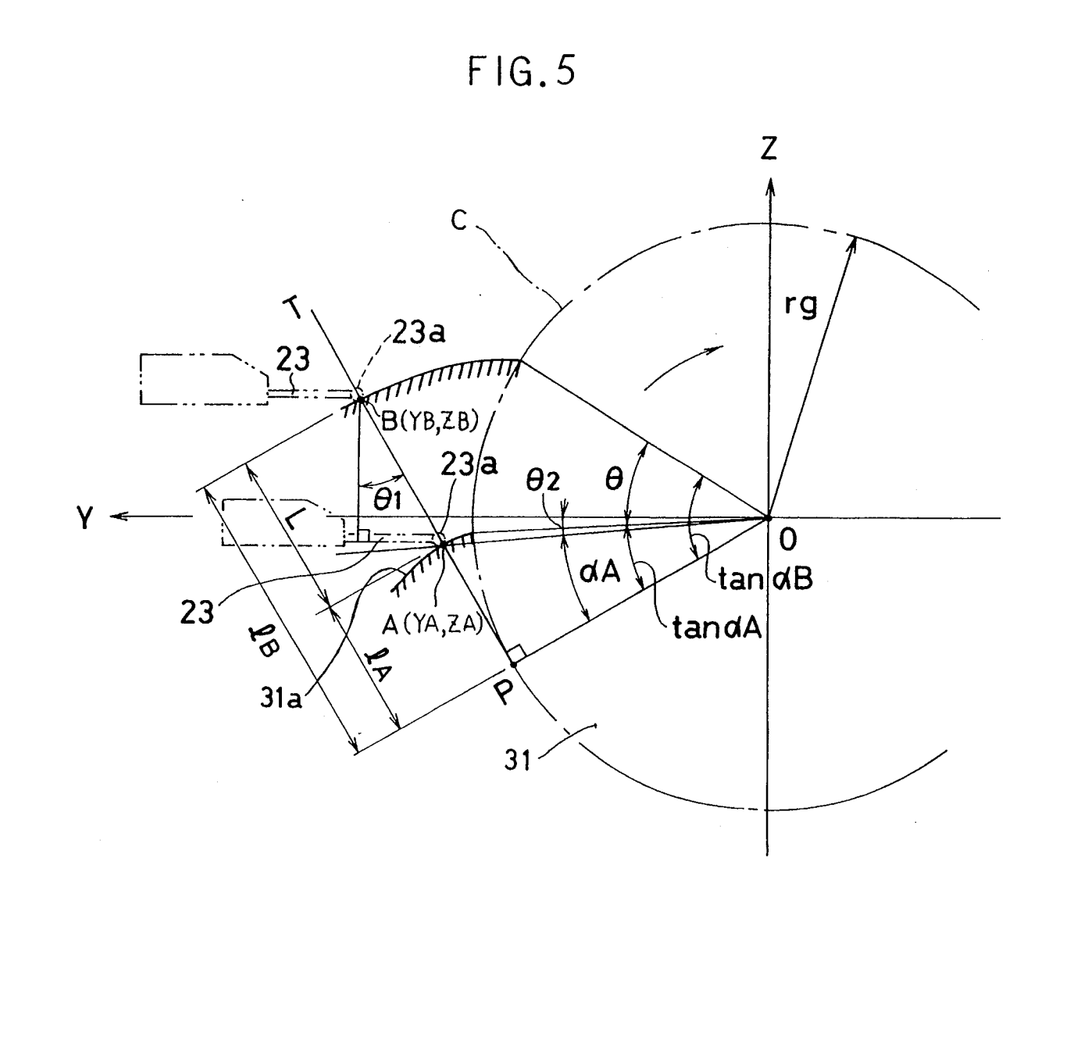
FIG. 5 is a view to show the principle of measuring the tooth profile of an involute gear according to one example of the present invention.

By initially setting the program so that $\theta_1 = \theta_2 + \alpha A = 0$ in the measurement principle shown in FIG. 5, the gauge head need not be moved in the Y-axis direction, enabling measurement under two-axis control of A- and Z-axes. Given $\theta_1 = \theta_2 + \alpha A = 90°$, the gauge head need not be moved in the Z-axis direction, enabling measurement under two-axis control of A- and Y-axes.

Alternatively, the tooth profile can be measured by tracing the coordinates of the tip end of the gauge head under NC control by causing the gauge head to contact with the tooth flank. This method is not necessarily limited to involute gears but allows for measurement of profiles of other types of gears. In case of involute gears, the tooth profile curve of an involute gear is approximated with an arc using the arc correction program of the NC device. The flank of one tooth is divided into plurality of arc segments, and the gauge head is caused to move tracing the arc. Because the contact position of the gauge head at the tip end shifts, the tool radius needs to be similarly corrected using the attached NC device.

Figure 6:
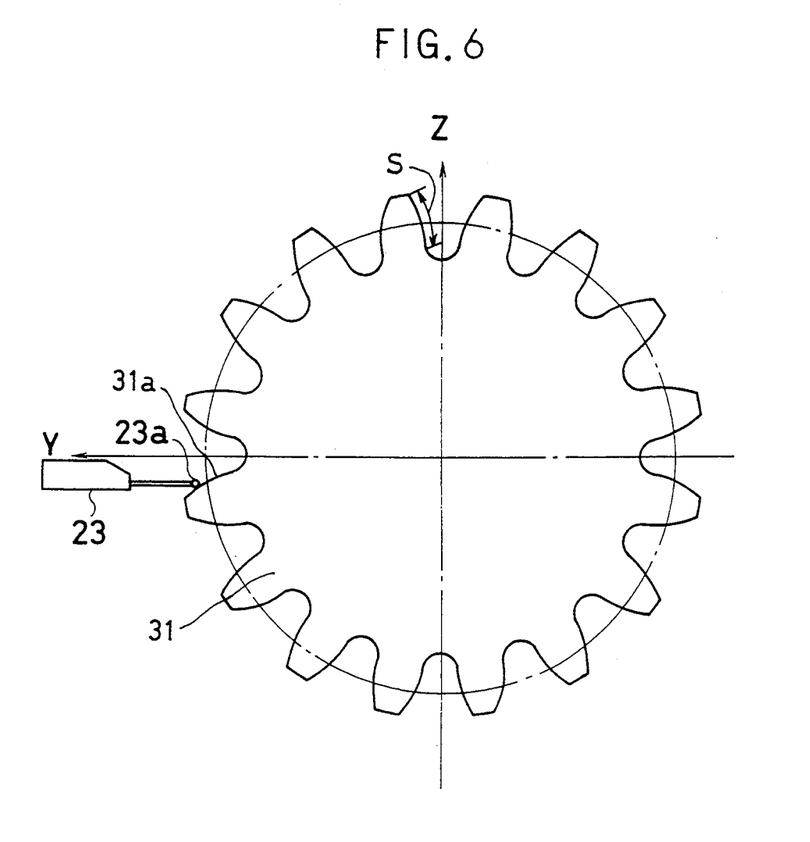
FIG. 6 is a view to show the principle of measuring the tooth profile according to another example of the present invention.

Another example of tooth profile measurement according to the present invention will be explained referring to the measurement principle shown in FIG. 6. In this example, the gauge head is abutted against the tooth flank 31a of a gear 31 by NC control to read the coordinate values at that point. More specifically, the tooth profile curve S of any arbitrary tooth is divided into small segments (for example 50 segments), and the theoretical tooth profile at each point is expressed in Y-Z coordinates. The actual Y-Z coordinates are measured by contacting the tip end 23a of the gauge head 23 at that particular segment. The tooth profile is measured by comparing the difference between the theoretical and actual Y-Z coordinate values. The difference means the error in the tooth profile. Because the contact position of the tip end 23 of the gauge head also changes, the tool radius needs to be corrected using the program of the NC device. The method according to this example is applicable to cycloid gears, trochoid gears and involute gears as well.

Figure 7:
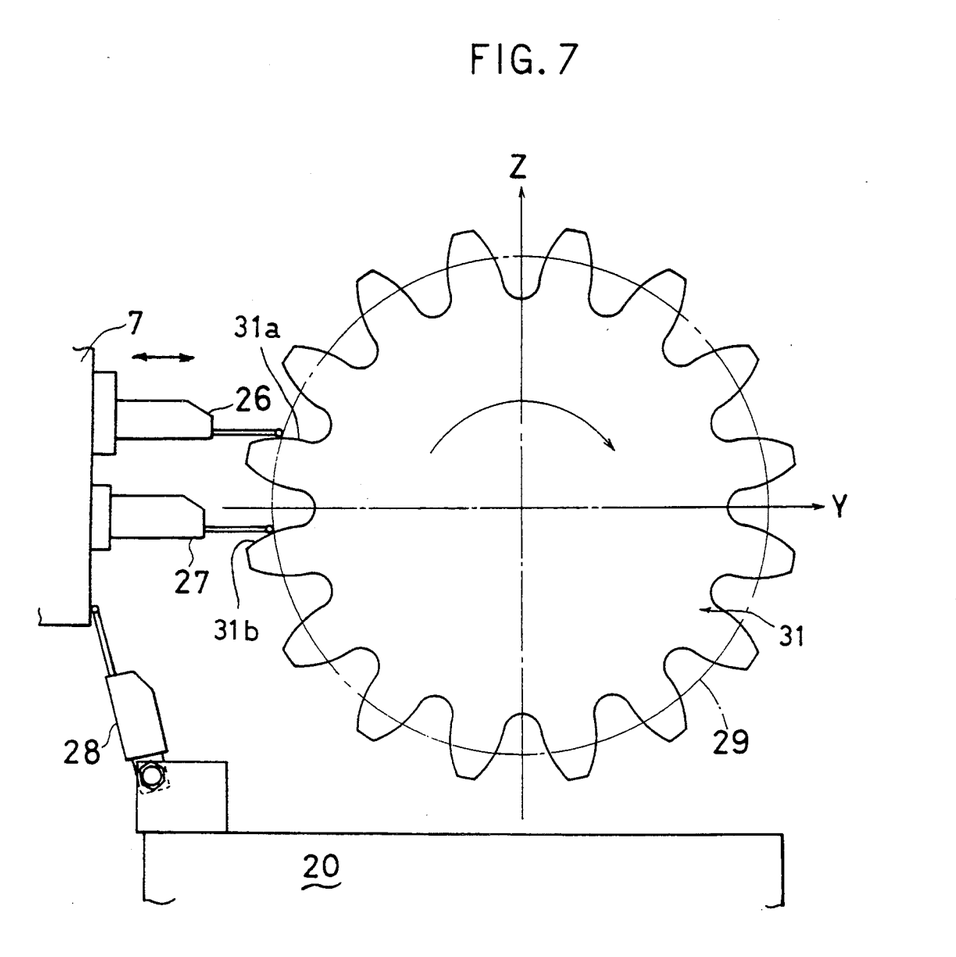
FIG. 7 is a schematic view to show the principle of measuring the gear pitch according to one example of the present invention.

Measurement of gears other than with respect to tooth profile will now be explained. Referring to FIG. 7 which shows the principle for gear pitch measurement, a pair of retractable gauge heads 26, 27 such as electric micrometers are attached onto the front or the side of the retractable grindstone holder 7. A detector 28 such as an electric micrometer for detecting the advance position of the grindstone holder 7 is secured on the side of the X-axis table 20 where it is immobile with respect to the Y-axis direction. Said pair of gauge heads 26, 27 in this example are distanced from each other so that they come in contact with the tooth flanks 31a and 31b respectively along the pitch circle of the gear 31. The gear pitch can be obtained by the readings of the gauge heads 26, 27. For measurement, the grindstone holder 7 is advanced to place the gauge heads 26, 27 respectively on the tooth flanks 31a, 31b on or near the pitch circle of the gear 31 mounted on the indexing table (the Y-Z coordinates at this time point are given as $Y_0$, $Z_0$). The grindstone holder 7 is then retracted in the Y-axis direction (in the direction away from the gear). The A-axis spindle is then turned for one pitch and the grindstone holder 7 is advanced once again in the Y-axis direction to position the same at said $Y_0$. The detector 28 provided on the X-axis table checks whether the grindstone holder 7 is accurately returned to $Y_0$. The difference in the readings of the gauge heads 26, 27 gives the error for one pitch. These steps are repeated for N number of times or for 360°. Because the difference between a pair of gauge heads is determined in this method, the indexing error at the A-axis does not affect the measurement error. Accumulated pitch errors or errors in the adjacent pitches can be obtained by processing the data that incorporate the data of respective gauge heads.

For the tooth trace measurement, the gauge head is abutted at a point on the tooth flank of any arbitrary tooth and is caused to move in the facewidth direction (in the X-axis direction) while the A-axis spindle is concurrently turned for a lead angle (in case of a helical gear). If the gear grinding machine is precise enough to allow grinding gears in accordance with the theoretical values, the deflection of the gauge head becomes zero. Helical gears can be measured by the simultaneous two-axis control as mentioned above, whereas movement in the X-axis direction alone suffices in the case of spur gears.

For the measurements mentioned above, electric micrometers or the like can be used to obtain data in electric signals. Such data can be inputted in a computer and automatically processed to determine the precision in the gear grinding operation. By processing the measurement results of the tooth profile and tooth trace, deviation of the current position of the grindstone wheel from its proper position in terms of both the Y- and X-axis directions can be calculated. The computer can then issue a command for correcting (offsetting) the deviation, allowing automatic grinding of correct gears.

Figure 8:
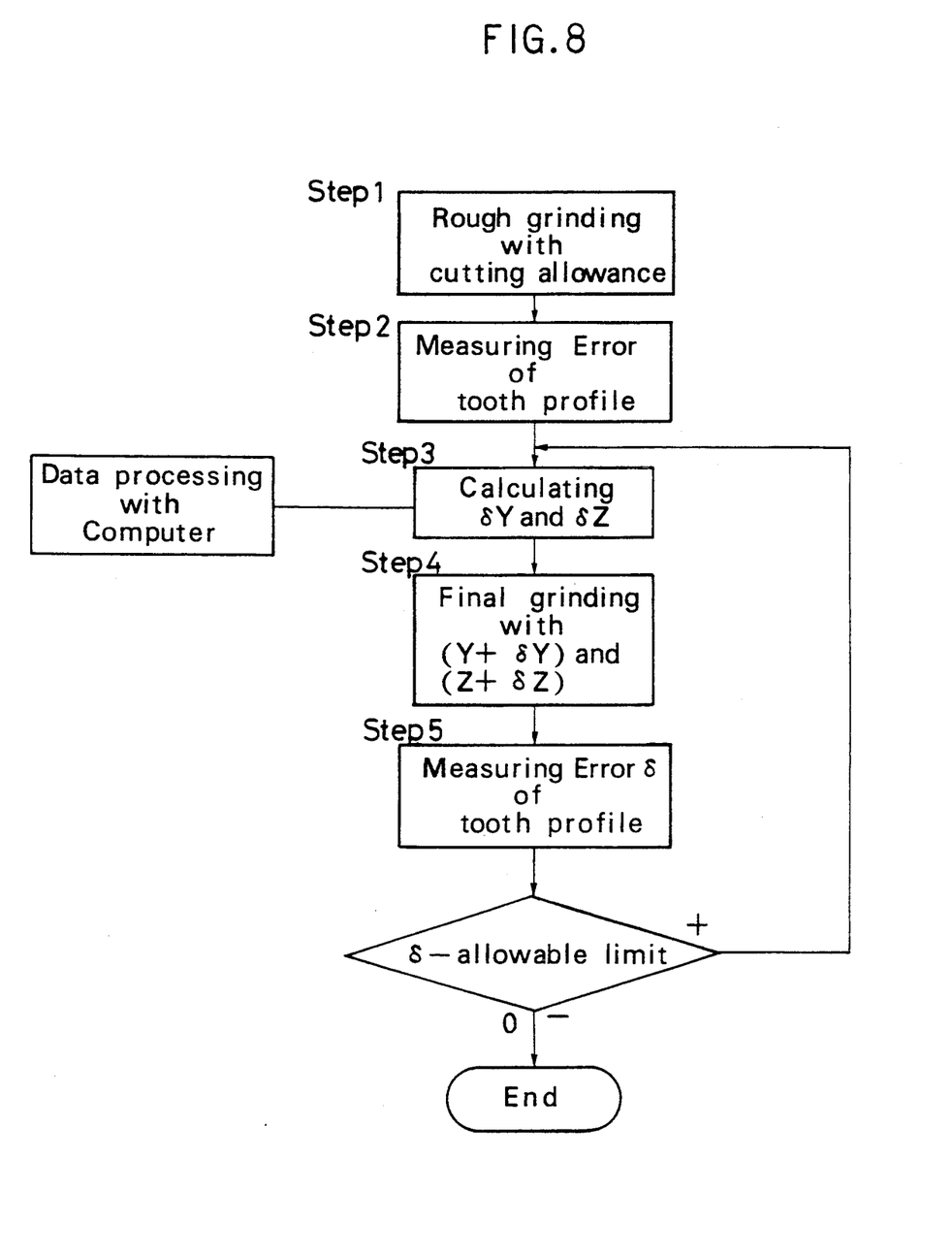
FIG. 8 is a flow chart to illustrate the process of automatic gear manufacturing at the final finishing stage using the NC gear grinding system according to the present invention.

FIG. 8 is a flow chart to show the process of automated gear production including the steps of determining the positional relation between the wheel and the workpiece to be ground utilizing the NC gear grinding system combined with the gear measurement device according to the present invention and of finishing the ground gear. A workpiece to be ground into a gear is placed on the NC gear grinding system combined with the gear measurement device according to the present invention and roughly ground leaving a cutting allowance (Step 1). The error in the tooth profile is measured in-situ on the grinding machine (Step 2). Displacement $\delta Y$ of the gauge head in the Y-axis direction and displacement $\delta Z$ of the gauge head in the Z-axis direction are calculated by data processing on the computer (Step 3). The workpiece is subjected to final grinding for the cutting amounts of $Y+\delta Y$ and $Z+\delta Z$ (Step 4). Then, without detaching the workpiece from the grinding machine, the error in the tooth profile is once again measured using the gauge head (step 5). If the measured error $\delta$ exceeds the allowable limit, the workpiece is ground again. If the error is within the allowable limit, the operation is deemed complete and the finished gear is taken out from the machine.

It should be noted that according to the present invention, the current conditions of the grinding machine such as the positional displacements in the wheel shaft and the workpiece shaft due to temperature increase can be corrected based on the measured data so that grinding operation can be conducted under correct conditions at all times.

As has been described in the foregoing, the present invention enables the ground gear to be measured in-situ without detaching the wheel or the ground gear from the machine. After rough grinding, the workpiece is measured and necessary corrections are made based on the measured data before proceeding with the final grinding. This enables automatic and efficient manufacture of high precision gears. In the prior art grinding operation for high precision gears, correcting displacements due to temperature changes is highly difficult and often requires prolonged preliminary conditioning running of the machine, use of a thermostatic chamber, or the use of cast materials with smaller thermal expansion coefficients. The present invention enables highly precise grinding of gears under relatively loose control of temperature. The present invention is advantageous in a number of aspects such as that it is applicable not only to involute gears but is also applicable to measurement of curved plates of a Cyclo Reduction Gear (registered trademark).

What is claimed is:

1. A method for measuring a gear on the NC grinding machine for grinding a workpiece, comprising the steps of:

attaching at least one gauge head to a moveable grindstone holder of the NC grinding machine having a grindstone, wherein said gauge head is, when measuring said workpiece, located on a grindstone side of said workpiece, retracting the gauge head away from the grindstone of the grindstone holder and away from the workpiece, grinding the workpiece into a gear on said NC grinding machine by moving the grindstone towards the workpiece, abutting the gauge head against a tooth flank of the ground gear located between the grinder and the gear without detaching the gauge head from the grinding machine, and controlling functions of a plurality of parts on the NC grinding machine for measuring the gear on said machine.

2. The method of measuring a gear as claimed in claim 1 wherein said controlling step comprises:

simultaneously controlling movement of said grindstone holder and rotation of said gear about an axial line so that said gauge head is caused to move along the tangential line of a basic circle portion of the gear, and the tooth profile of the gear is measured based on deflection of the gauge head during said movement.

3. The method for measuring a gear as claimed in claim 1 which comprises:

obtaining theoretical coordinate values of a Y-axis and a Z-axis at a plurality of points of a ground gear mounted on the NC grinding machine assuming a vertical direction of the grindstone holder to be in the Z-axis direction and a direction perpendicular to said Z-axis direction as well as to a feed direction of a work table to be in the Y-axis direction, and measuring actual coordinate values of the Y-axis and Z-axis, respectively, at said plurality of points by contacting the gauge head with the tooth flank of the ground gear at each of the respective points to thereby measure the tooth profile of the gear based on the difference between the theoretical coordinate values and the actual coordinate values of the Y-axis and Z-axis.

4. A method for measuring a gear which comprises:

rotating a gear and moving a grindstone in an axial direction at a lead angle that corresponds to a helix angle of a tooth trace of the gear by utilizing control functions of the NC gear grinding machine to thereby measure the tooth trace of the gear, attaching the gauge heads to the grindstone holder of the NC gear grinding machine so as to be on a grindstone side of the gear when measuring the workpiece, abutting the gauge heads against a tooth flank, located between the grinder and the gear, at a location which is one of on or near the pitch circle of the gear to measure the gear pitch, and indexing the gear when the grindstone holder is retracted.

5. An NC grinding system combined with a gear measuring device which comprises:

an NC gear grinding machine which includes a grindstone holder for a grindstone and a gear holder, a ground gear mounted on said gear holder, at least one gauge head attached to the grindstone holder on a grindstone side of the gear when measuring said gear so that the gauge head is located between the grindstone and the gear and contacts a tooth flank of the ground gear, when measuring said gear and a mechanism for retracting said gauge head to a position such that said gauge head does not interfere with the gear and the grindstone during grinding operation.

6. The NC gear grinding system combined with a gear measuring device as claimed in claim 5 wherein said at least one gauge head comprises a pair of gauge heads so as to respectively contact a pair of tooth flanks of the gear wherein the gauge heads are retractable by said mechanism for retracting said gauge head to a position where said gauge heads do not interfere with the gear and the grindstone during grinding operation, and which comprises a detector for detecting an advance position of the grindstone holder for measurement of gear pitch is provided on the NC gear grinding machine.

7. The NC gear grinding system combined with a gear measuring device as claimed in claim 5 wherein said at least one gauge head is journalled to the grindstone holder and said system comprises an arm mounted on said grindstone holder and connected to said gauge head for swinging the gauge head between a position where the gauge head opposes the gear and a retracted position away from the gear.

* * * * *